United States Patent Office 2,728,757
Patented Dec. 27, 1955

2,728,757

POLYMERIZATION PROCESS WITH GROUP V-A METAL AND METAL BOROHYDRIDE CATALYST

Edmund Field, Chicago, and Morris Feller, Park Forest, Ill., assignors to Standard Oil Company, Chicago, Ill., a corporation of Indiana No Drawing. Application August 31, 1953,
Serial No. 377,678

20 Claims. (Cl. 260—94.9)

This invention relates to a novel polymerization process. In a more specific aspect, this invention relates to a novel process for the polymerization of ethylene, propylene or their mixtures in the presence of alkali metal borohydrides and a solid catalytic material containing an oxide of a metal of group V-A of the periodic table, viz. one or more of the oxides of V, Nb or Ta.

One object of our invention is to provide novel and highly useful catalysts for the preparation of high molecular weight polymers from ethylene-containing gas mixtures. Another object is to provide a novel process for the polymerization of ethylene to high molecular weight resinous polymers and grease-like and wax-like polymers. A further object is to provide a relatively low temperature, low pressure process for the conversion of ethylene-containing gases to high molecular weight resinous or plastic materials.

Yet another object of our invention is to provide extremely active promoters for the action of solid catalysts comprising an oxide of a metal of group V-A of the periodic table for the polymerization of ethylene to tough, highly crystalline, resinous products. These and other objects of our invention will become apparent from the ensuing description thereof.

Briefly, the inventive process comprises the conversion of ethylene principally to high molecular weight normally solid polymers by contact with one or more of the oxides of vanadium, niobium, or tantalum, for example, a partially reduced-vanadium pentoxide extended upon a support, and an alkali metal borohydride. The inventive process is effected at temperatures between about 75° C. and about 325° C., preferably between about 130° C. and 260° C., and pressures between about atmospheric and 15,000 p. s. i. g. or higher, preferably between about 200 and 5000 or about 1000 p. s. i. g. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media for ethylene polymerization include various hydrocarbons, particularly an aromatic hydrocarbon such as benzene, toluene or xylenes. For the polymerization of propylene, less readily alkylatable reaction media such as cycloparaffins, e. g., cyclohexane or decalin, or paraffins, e. g., iso-octane, are preferred.

However, the conversion of ethylene-containing gas streams can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000 and tough, resinous ethylene homopolymers having an approximate specific viscosity ($\times 10^5$) of 10,000 to more than 300,000 [($\eta$ relative $-1)\times 10^5$]. By the term "tough, resinous polyethylene" as used herein, we mean polymer having a brittle point below $-50°$ C. (A. S. T. M. Method D746–51T), impact strength greater than two foot pounds per inch of notch (A. S. T. M. Method D256–47T—Izod machine) and minimum elongation at room temperature (25° C.) of 100%.

With the ethylene charge there may be included other polymerizable materials such as mono-olefinic hydrocarbons, e. g., propylene, n-butylenes, iso-butylene, t-butyl-ethylene, and the like, usually in proportions between about 1 and about 25% by weight, based on the weight of ethylene.

The alkali metal borohydrides consist of the borohydrides having the general formula $MBH_4$, wherein M is lithium, sodium, potassium, rubidium or cesium.

Other borohydrides which we may employ, for example, are those of magnesium, beryllium, aluminum, thorium, hafnium, zirconium and uranium. These borohydrides are all characterized by their ability to reduce polyvalent metal salts, for example, by their ability to reduce Ti in $TiCl_4$ to the $+3$ valence state. These metal borohydrides are also characterized by the fact that said metal has an electronegativity of at least one on the Pauling scale (L. Pauling, "The Nature of the Chemical Bond," Cornell University Press (1939), p. 64).

The employment of an alkali metal borohydride in the reaction zone has numerous important practical consequences, as compared to processes wherein said metal oxide catalysts are employed alone. Thus, in the presence of both the alkali metal borohydride and the metal oxide catalyst, the subgroup metal oxide catalyst can be employed without preliminary reduction, higher yields of solid polymers can be obtained, the metal oxide catalyst can function well in the presence of large proportions of liquid reaction medium, the metal oxide catalyst retains strong polymerization activity for a long period of time (long catalyst life), polymers having desirable ranges of physical and chemical properties can be readily produced by controlling the reaction variables, etc., as will appear from the detailed description and operating examples which follow.

The function or functions of the alkali metal borohydride in our process are not understood. The alkali metal borohydrides promote the action of the group V-A metal oxide catalysts to increase the productivity (polymer yield) of said catalysts. It might be assumed that said borohydrides function merely to react with catalyst poisons which might be present in small proportions of the order of a few parts per million in ethylene, propylene and/or in the liquid reaction medium; we have found, however, that even the use of extremely pure ethylene and liquid reaction medium does not produce solid polymer in the yields or quality which can be attained by the process of the present invention.

In the presence of alkali metal borohydrides, the group V-A metal oxide catalysts can be extended upon a variety of difficultly reducible metal oxides, e. g., upon alumina, titania, zirconia; upon silica supports such as silica gel, kieselguhr, diatomite; silica-alumina, aluminosilicates, such as various clays and bleaching earths; and even adsorptive carbon, which is however not preferred. In a practical process, it is preferable to furnish a difficultly reducible metal oxide for the group V-A metal oxide catalyst, e. g., gamma-alumina.

The proportion of alkali metal borohydride employed can be varied from about 0.005 to about 2 parts by weight per part by weight of the metal oxide catalyst (total weight of solid catalyst). The optimum proportions can readily be determined in specific instances, by simple small-scale tests with the specific feed stocks, liquid reaction medium, reaction medium:catalyst ratio, catalyst, temperature, pressure and nature of the product which is desired. Usually $LiBH_4$ or $NaBH_4$ are employed in proportions between about 0.05 and about 2 parts by weight per part by weight of metal oxide catalyst at ratios between about 5 and about 2000 volumes of liquid medium per part by weight of metal oxide catalyst.

The relative proportion of support to the catalytic metal oxide is not critical and may be varied throughout a relatively wide range such that each component is present in amounts of at least approximately 1 weight percent. The usual metal oxide-support ratios are in the range of about 1:20 to 1:1, or approximately 1:10. We employ conditioned alumina-metal oxide catalysts composed of gamma-alumina base containing about 1 to 80%, preferably about 5 to 35%, or approximately 10%, of catalytic metal oxide supported thereon.

Gamma-alumina, titania and zirconia supports for our catalysts may be prepared in any known manner and the oxides of vanadia or other groups V-A metal may likewise be incorporated in, or deposited on, the support in any known manner.

Vanadia or other vanadium-oxygen compound, such as cobalt vanadate, may be incorporated in the catalyst base in any known manner, e. g. by impregnation, coprecipitation, co-gelling, and/or absorption, and the catalyst base and/or finished catalyst may be heat-stabilized in the known manners heretofore employed in the preparation of hydroforming or hydrofining catalysts. Cobalt, chromium, magnesium, calcium, zinc, nickel and copper salts of vanadic, niobic and tantalic acids may also be employed, with or without a support.

Although no reducing treatment need be effected on the metal oxide catalysts when they are employed in the presence of an alkali metal borohydride, a reducing or conditioning treatment is preferred in commercial processing. The conditioning or reducing treatment of the pentavalent group V-A metal oxide is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressure in the reducing and conditioning operation may be varied from subatmospheric pressures, for example even 0.1 pound (absolute) to relatively high pressures up to 3000 p. s. i. g., or even more. The simplest reducing operation may be effected with hydrogen simply at about atmospheric pressure. The partial reduction of the metal oxide catalyst in which the metal is present in its pentavalent state can be effected in the presence of the reactive metal borohydride promoter, prior to contacting the combination of catalysts with ethylene.

We have at times observed that an induction period before ethylene polymerization can be eliminated or substantially reduced by pressuring hydrogen into the reactor containing the solvent, ethylene, metal oxide catalyst and borohydride, e. g., at hydrogen pressures between about 10 and about 900 p. s. i. g., preferably 100–400 p. s. i. g.; under these conditions a small proportion of the ethylene is reduced to ethane.

Lithium aluminum hydride, an exceptionally active reducing agent, conditions and activates catalysts containing pentavalent group V-A metal oxides even at temperatures as low as 35° C., although in general temperatures between about 100 and about 300° C. are employed. In practice, for example, a catalyst containing free or chemically combined $V_2O_5$ (e. g., combined as in $CoV_2O_6$) is treated with a suspension of $LiAlH_4$ in a hydrocarbon solvent at weight ratios of about 0.01 to about $1LiAlH_4$ per weight of solid catalyst. Sodium hydride (or sodium plus $H_2$) is effective in reducing and conditioning pentavalent group V-A metal oxide catalysts such as $V_2O_5$ at temperatures above about 180° C. and can be employed in the same proportions as $LiAlH_4$. The reactive metal borohydrides of the present invention may likewise be employed to effect partial prereduction of the group V-A metal oxide catalysts, employing essentially the same conditions as when $LiAlH_4$ is used.

The conditioning treatment hereinabove described is useful not only for fresh catalyst, but also for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by extraction with water or dilute aqueous acids, thereafter burning combustible deposits therefrom with oxygen followed by the conditioning step.

The catalysts can be employed in various forms and sizes, e. g., as powder, granules, microspheres, broken filter cake, lumps, or shaped pellets. A convenient form in which the catalysts may be employed is as granules of about 20–100 mesh/inch size range. Pellets or granules containing both the metal oxide catalyst and solid metal borohydride may be prepared and used in our process.

The charging stock to the present polymerization process preferably comprises essentially ethylene. The ethylene charging stocks may contain hydrogen and hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous high molecular weight products.

It is desirable to minimize or avoid the introduction of oxygen, carbon dioxide, water or sulfur compounds into contact with the catalyst.

In general, polymerization can be effected in the present process at temperatures between about 75° C. and about 325° C. Usually polymerization is effected in the present process at temperatures between about 110° C. and about 275° C. or the preferred narrower range of about 220 to about 260° C. The conjoint use of polymerization temperatures between about 220 and about 260° C. and a liquid hydrocarbon reaction medium such as benzene, xylenes, decalin or methyl decalins is highly desirable in producing normally solid ethylene polymers having specific viscosities ($\times 10^5$) ranging on the average from about 5000 to about 30,000 in continuous operations with relatively long on-stream periods and clean catalysts.

The present process may be employed for the production of relatively high molecular weight ethylene hetero- and homo-polymers at relatively low pressures. The process of the present invention may be effected to some extent even at atmospheric pressure. The upper limit of the partial pressure of ethylene in the process is dictated by economic considerations and equipment limitations and may be 10,000 p. s. i. g., 20,000 p. s. i. g., or even more. A generally useful and economically desirable ethylene pressure range is between about 200 and about 5000 p. s. i. g., preferably between about 500 and about 1500 p. s. i. g., e. g. about 1000 p. s. i. g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly space velocities are usually selected between about 0.1 and about 10 volumes, preferably about 0.5 to 5 or about 2 volumes of ethylene solution in a liquid reaction medium, which is usually an aromatic hydrocarbon such as benzene, xylenes or tetralin, or a cycloaliphatic hydrocarbon, such as decalin (decahydronaphthalene). The amount of ethylene in such solution may be in the range of about 2 to 50% by weight, preferably about 2 to about 10 weight percent or, for example, about 5 to 10 weight percent.

When the ethylene concentration in the liquid reaction medium is decreased below about 2 weight percent, the molecular weight and melt viscosity of the polymeric products may drop sharply. The rate of ethylene polymerization tends to increase with increasing concentration of the ethylene in the liquid reaction medium. However, the rate of ethylene polymerization to form high molecular weight, normally solid polymers should not be such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the solid metal oxide catalyst particles or fragments may occur, resulting in catalyst carry-over as fines with the solution of polymerization products and extensive loss of catalyst from the reactor.

In batch operations, operating periods of between about one-half and about 10 hours, usually between about 1 and about 4 hours, are employed and the reaction autoclave is charged with ethylene as the pressure falls as a result of the ethylene conversion reaction.

The solvent:catalyst weight ratio can be varied in the range of about 5 to about 2000, or even higher for flow systems, preferably between about 50 to about 1000. The employment of high solvent:catalyst ratios, which is rendered possible by the presence of a reactive metal borohydride in the reaction zone, is very important in obtaining high yields of polymer.

Ethylene, propylene or their mixtures may be polymerized in the gas phase and in the absence of a liquid reaction medium by contact with alkali metal borohydride and the metal oxide catalyst. Upon completion of the desired polymerization reaction it is then possible to treat the solid catalyst for the recovery of the solid polymerization products, for example by extraction with suitable solvents. However, in the interests of obtaining increased rates of olefin conversion and of continuously removing solid conversion products from the catalyst, it is desirable to effect the conversion of ethylene in the presence of suitable liquid reaction media. The liquid reaction medium may also be employed as a means of contacting the olefin with catalyst by preparing a solution of olefin in the liquid reaction medium and contacting the resultant solution with the polymerization catalyst. The liquid reaction medium functions as a solvent to remove some of the normally solid product from the catalyst surface.

Various classes of individual hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylenes, mesitylene and xylene p-cymene mixtures can be employed. Tetrahydronaphthalene can also be employed. In addition, we may employ such aromatic hydrocarbons as ethylbenzene, isopropylbenzene, n-propylbenzene, sec-butylbenzene, t-butylbenzene, ethyltoluenes, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the reaction conditions. Either pure alkanes of cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, isooctane (2,2,4-trimethylpentane), n-decane, n-dodecane, cyclohexane, methylcyclohexane, dimethylcyclopentane, ethylcyclohexane, decalin, methyldecalins, dimethyldecalins and the like.

We may also employ a liquid hydrocarbon reaction medium comprising liquid olefins, e. g., n-hexenes, cyclohexene, 1-octene, hexadecenes and the like.

The normally solid polymerization products which are retained on the catalyst surface or grease-like polymers may themselves function to some extent as a liquefied hydrocarbon reaction medium, but it is highly desirable to add a viscosity reducing hydrocarbon, such as those mentioned above, thereto in the reaction zone.

The liquid hydrocarbon reaction medium should be freed of poisons by acid tretament, e. g., with anhydrous p-toluenesulfonic acid, sulfuric acid, phosphoric acid or by equivalent treatments, for example with aluminum halides or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of suitable treatments.

We have purified C. P. xylenes by refluxing with a mixture of 7.5 w. per cent $MoO_3$-on-$Al_2O_3$ hydroforming catalyst and $LiAlH_4$ (50 cc. xylene—1 g. catalyst—0.2 g. $LiAlH_4$) at atmospheric pressure, followed by distillation of the xylenes. Still more effective purification of solvent can be achieved by heating it to about 225–250° C. with either sodium and hydrogen or NaH plus 7.5 w. per cent $MoO_3$-on-alumina in a pressure vessel.

The liquid hydrocarbon reaction medium is present in the reaction zone as a distinct liquid phase. Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone. It should be noted, however, that in some instances the solvent may be present as a dense gas phase.

When solvents such as xylenes are employed, some alkylation thereof by ethylene can occur under the reaction conditions. Propylene is a far more reactive alkylating agent than ethylene and when propylene is present in the feed it is desirable to employ a non-alkylatable solvent such as decalin. The alkylate is removed with grease in the present process, can be separated therefrom by fractional distillation and can, if desired, be returned to the polymerization zone.

In continuous-flow operations, we may employ the methods described in our copending application for United States Letters Patent, Serial No. 324,611, filed December 6, 1952.

The following examples are included to illustrate but not necessarily to limit the claimed invention. The reactor employed in each instance was a pressure vessel provided with a magnetically-operated stirring mechanism. Air was excluded from the reactor during the charging process by maintaining a flow of nitrogen therethrough and residual air was flushed from the autoclave by a stream of hydrogen, before proceeding with the reaction.

In the examples, by the term "specific viscosity" we mean—(relative viscosity $-1) \times 10^5$—and by "relative viscosity" we mean the ratio of the time of efflux of a solution of 0.125 g. polymer in 100 cc. of C. P. xylenes at 110° C. from a viscosimeter as compared with the time of efflux of 100 cc. of C. P. xylenes at 110° C. The melt viscosity is determined by the method of Dienes and Klemm, J. Appl. Phys. 17, 458–71 (1946).

*Example 1*

The group V–A metal oxide catalyst was 10 w. per cent $V_2O_5$ supported upon gamma-alumina, 30–100 mesh, which was partially reduced before use with molecular hydrogen at 350° C., atmospheric pressure, for 16 hours. A 100 ml. reactor was charged with 5 g. of the metal oxide catalyst, 0.5 g. of $LiBH_4$ and 50 cc. of deoxygenated and dehydrated xylenes. After pressure testing with hydrogen, the reactor was heated to 228° C., after which ethylene was injected to a partial pressure of 900 p. s. i. Reaction was continued for 65 minutes, in the course of which the ethylene partial pressure drop was 495 p. s. i. The reaction yielded 141 w. per cent of normally solid ethylene polymer, based on the weight of the group V–A catalyst, together with 9 w. per cent of a grease-like ethylene polymer and 15 w. per cent of xylenes alkylate. It was found that the polymer could be molded into a tough and flexible film. The solid ethylene polymer was characterized by a density (24° C.) of 0.9811 and melt viscosity of $1.9 \times 10^6$ poises.

By way of contrast, the following control run is offered, in which no promoter was employed. A 250 ml. reactor was charged with 50 cc. of purified toluene and 10 g. of a 10 w. per cent $V_2O_5$-alumina catalyst which had been reduced with hydrogen at 350° C. for 16 hours at atmospheric pressure. The reactor contents were heated with stirring under a blanket of hydrogen to 202° C. and ethylene was then injected to a partial pressure of 850 p. s. i. The total ethylene pressure drop over a period of 22 hours was only 75 p. s. i. and only trace amounts of solid and grease-like polymer were produced.

*Example 2*

A 250 cc. reactor was charged with 100 cc. of purified toluene, 0.5 g. of $LiBH_4$ and 5 g. of 10 w. per cent $Ta_2O_5$ supported on silica gel which had been reduced with hydrogen at temperatures ranging from 350° C. to 510° C. and atmospheric pressure for 16 hours. The reactor contents were heated with stirring under a hydrogen atmosphere to 232° C. and ethylene was then injected to a partial pressure of 790 p. s. i. Reaction was continued for 10 hours. The reaction yielded 85 w. per cent of normally solid ethylene polymer, based on the weight of tantalum oxide catalyst and 57 w. per cent of grease-like ethylene polymer, on the same basis.

*Example 3*

The group V–A catalyst was 3 w. per cent $Nb_2O_5$ supported on gamma alumina, 20–30 mesh, which was partially reduced before use by treatment with molecular hydrogen at 400° C., atmospheric pressure, for 16 hours. A 100 ml. pressure vessel was charged with 5 g. of the group V–A catalyst, 0.5 g. of $LiBH_4$ and 50 cc. of dehydrated and deoxygenated toluene. After the reaction vessel was pressure tested with hydrogen, its contents were heated to 230° C., after which ethylene was injected to a partial pressure of 760 p. s. i. Reaction was continued for a period of 20.5 hours, during which time the partial pressure of ethylene decreased 495 p. s. i. The reaction yielded about 13 w. per cent of solid ethylene polymer, together with 6 w. per cent of greas-like ethylene polymer. The solid ethylene polymer was characterized by a density (24° C.) of 0.9623 and specific viscosity of 23,700.

*Example 4*

The group V–A catalyst was 10 w. percent $Nb_2O_5$ supported on silica gel, 30–100 mesh, which was partially reduced before use with molecular hydrogen at 400° C., atmospheric pressure, for 16 hours. A 250 ml. pressure vessel was charged with 5 g. of the group V–A catalyst, 0.5 g. of $LiBH_4$ and 100 cc. of dehydrated and deoxygenated toluene. The reactor was pressure tested with hydrogen, heated to 228° C., after which ethylene was injected to a partial pressure of 750 p. s. i. Reaction was continued for a period of 19 hours over the course of which ethylene was injected intermittently to maintain a substantial partial pressure. The ethylene partial pressure drop during reaction was more than 2855 p. s. i. The reaction yielded 445 w. percent of solid ethylene polymer, based on the weight of the group V–A catalyst, together with 120 w. percent of grease-like ethylene polymer and some toluene alkylate boiling over the range of 113–245° C. The density of the solid ethylene polymer was 0.9632 (24° C.) and its specific viscosity was 5000.

*Example 5*

A 250 cc. reactor was charged with 100 cc. of purified toluene, 0.25 g. of $LiBH_4$ and 1 g. of unreduced 10 w. per cent $V_2O_5$ supported upon silica gel. The reactor contents were heated with stirring under a hydrogen atmosphere to 227° C. and ethylene was then introduced to a partial pressure of 785 p. s. i. Reaction was continued for 20 hours. The reaction yielded 600 w. percent of resinous ethylene polymer, based on the weight of the oxide catalyst, together with 135 w. percent of grease-like ethylene polymer. The density of the resinous polymer at 24° C. was 0.9641 and its melt viscosity was $6.1 \times 10^4$.

By way of contrast, the following control run is offered, wherein no promoter was employed and the oxide catalyst concentration was increased ten-fold. Also, prereduced oxide catalyst was employed, whereas in the experiment described immediately above, it was demonstrated that prereduction could be obviated. The 250 ml. bomb was charged with 100 cc. of purified toluene and 10 g. of 10 w. percent $V_2O_5$ supported upon silica gel (about 40 to 100 mesh per inch) which had been reduced with hydrogen at 350° C. for 16 hours at atmospheric pressure. The reactor contents were heated with stirring under a hydrogen atmosphere to 230° C. and ethylene was then injected to the partial pressure of 775 p. s. i. A slight pressure drop was noted over a period of 20.5 hours. No grease-like or solid ethylene polymer was produced, but only a colored, normally liquid material in the amount of 4.0 g.

*Example 6*

A 250 ml. reactor was charged with 100 cc. of purified toluene, 2 g. of $NaBH_4$ and 2 g. of unreduced 10 w. percent $V_2O_5$ supported upon silica gel. The reactor contents were heated with stirring under a hydrogen atmosphere to 232° C. and ethylene was then injected to the partial pressure of 775 p. s. i. Reaction was continued for 20.5 hours. The reaction yielded 29 w. percent, based on the oxide catalyst, of resinous ethylene polymer together with 47 w. percent of grease-like ethylene polymer.

*Example 7*

The 250 ml. reactor was charged with 100 cc. of purified toluene, 1 g. of NaBH$_4$ and 2 g. of 10 w. percent V$_2$O$_5$ supported on gamma-alumina which had been reduced with hydrogen at 350° C. for 16 hours at atmospheric pressure (20 mesh per inch). The reactor contents were heated with stirring under a hydrogen atmosphere to 243° C. and ethylene was then injected to the partial pressure of 840 p. s. i. Reaction was continued for 19 hours. The reaction yielded 20 w. percent, based on oxide catalyst, of solid ethylene polymer and 80 w. percent of grease-like ethylene polymer.

*Example 8*

The 250 ml. reactor was charged with 100 cc. of silica gel-treated decalin, 0.5 g. of LiBH$_4$ and 5 g. of 10 w. percent V$_2$O$_5$ supported upon silica gel which was pre-reduced with hydrogen at 350° C. for 16 hours at atmospheric pressure. Reaction was effected at 201° C. employing initial propylene partial pressure of 320 p. s. i. and initial ethylene partial pressure of 575 p. s. i. Reaction was continued for 21 hours. The reaction yielded 117 w. percent, based on oxide catalyst, of solid polymer and 53 w. percent of grease-like polymer.

*Example 9*

The 250 cc. reactor was charged with 100 cc. of purified toluene, 0.5 g. of LiBH$_4$ and 5 g. of unsupported V$_2$O$_5$ which was prereduced with hydrogen at 350° C. for 16 hours at atmospheric pressure. The contents of the reactor were heated with stirring under a hydrogen atmosphere to 202° C. and ethylene was then injected to a partial pressure of 850 p. s. i. Reaction was continued for 20 hours to yield 50 w. percent, based on oxide catalyst, of grease-like ethylene polymer and 5 w. percent of normally solid ethylene polymer.

The polymers produced by the process of this invention can be subjected to such after-treatment as may be desired, to fit them for particular uses or to impart desired properties. Thus, the polymers can be extruded, mechanically milled, filmed or cast or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about 0.01 and about 1 percent of the various polymers of ethylene produced by the process of the present invention can be dissolved or dispersed in hydrocarbon lubricating oils to increase V. I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluent liquid hydrocarbon oils and as gelling agents for such oils.

The polymers produced by the present process can be subjected to chemical modifying treatments, such as halogenation, halogenation followed by dehalogenation, sulfo- halogenation, e. g., by treatment with sulfuryl chloride or a mixture of sulfur dioxide and chlorine, sulfonation, and other reactions to which hydrocarbons may be subjected.

Having thus described our invention, what we claim is:

1. A process for the production of an ethylene polymer having a molecular weight of at least about 300, which process comprises contacting ethylene at a reaction temperature between about 75° C. and about 325° C. with an alkali metal borohydride and a group V–A metal oxide catalyst, and separating an ethylene polymer having a molecular weight of at least about 300 thus produced.

2. The process of claim 1 wherein said alkali metal borohydride is NaBH$_4$.

3. The process of claim 1 wherein said alkali metal borohydride is lithium borohydride.

4. The process of claim 1 wherein said group V–A metal oxide is partially prereduced before use.

5. The process of claim 1 wherein said group V–A metal oxide catalyst is vanadia.

6. A process for the production of a normally solid hydrocarbon material, which comprises contacting ethylene with an alkali metal borohydride and with an oxide of a metal of group V–A of the periodic table in the presence of a liquid hydrocarbon reaction medium at a reaction temperature between about 75° C. and about 325° C., and separating a normally solid hydrocarbon material thus produced.

7. The process of claim 6 wherein said oxide is partially pre-reduced before use.

8. The process of claim 6 wherein said liquid hydrocarbon reaction medium is a saturated hydrocarbon.

9. The process of claim 6 wherein said liquid hydrocarbon reaction medium is a monocyclic aromatic hydrocarbon.

10. The process of claim 6 wherein said borohydride is lithium borohydride.

11. The process of claim 6 wherein said borohydride is sodium borohydride.

12. A process for the production of a resinous solid ethylene polymer which comprises contacting ethylene and a liquid hydrocarbon reaction medium with an alkali metal borohydride and an oxide catalyst comprising a minor proportion of a group V–A metal oxide supported upon a major proportion of a difficultly reducible metal oxide, the weight ratio of said borohydride to said oxide catalyst being between about 0.005 and about 2, effecting said contacting at a reaction temperature between about 75° C. and about 325° C., and separating a resinous solid ethylene polymer thus produced.

13. The process of claim 12 wherein the reaction temperature is between about 130° C. and about 260° C.

14. A process for the production of a resinous solid ethylene polymer which comprises contacting ethylene in a concentration between about 2 weight percent and about 5 weight percent in a monocyclic aromatic hydrocarbon liquid with an alkali metal borohydride and an oxide catalyst comprising a minor proportion of a group V–A metal oxide supported upon a major proportion of a difficultly reducible metal oxide, the weight ratio of said borohydride to said oxide catalyst being between about 0.005 and about 2, effecting said contacting at a reaction temperature between about 75° C. and about 325° C., and separating a resinous solid ethylene polymer thus produced.

15. The process of claim 14 wherein said oxide catalyst is partially pre-reduced before use.

16. The process of claim 14 wherein said group V–A metal oxide is vanadia, said difficultly reducible metal oxide is silica and said alkali metal borohydride is lithium borohydride.

17. The process of claim 14 wherein said group V–A metal oxide is vanadia, said difficultly reducible metal oxide is silica and said alkali metal borohyride is sodium borohydride.

18. The process of claim 14 wherein said group V–A metal oxide is vanadia, said difficultly reducible metal oxide is alumina and said metal borohydride is sodium borohydride.

19. The process of claim 14 wherein said group V–A metal oxide is vanadia, said difficultly reducible metal oxide is alumina and said metal borohydride is lithium borohydride.

20. The process of claim 14 wherein said group V–A metal oxide is niobia, said difficultly reducible metal oxide is silica and said alkali metal borohydride is lithium borohydride.

No references cited.